United States Patent
Plenderleith et al.

(10) Patent No.: US 10,397,143 B1
(45) Date of Patent: Aug. 27, 2019

(54) PREVENTING TRANSMISSION OF ERRORS IN A COMPUTING NETWORK

(71) Applicant: Amazon Technologies, Inc., Seattle, WA (US)

(72) Inventors: Jamie Plenderleith, Dublin (IE); Alan Michael Judge, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 15/627,080

(22) Filed: Jun. 19, 2017

(51) Int. Cl.
*H04L 12/939* (2013.01)
*H04L 1/24* (2006.01)
*H04L 12/947* (2013.01)
*H04L 29/06* (2006.01)

(52) U.S. Cl.
CPC .............. *H04L 49/552* (2013.01); *H04L 1/24* (2013.01); *H04L 49/257* (2013.01); *H04L 49/55* (2013.01); *H04L 63/12* (2013.01)

(58) Field of Classification Search
None
See application file for complete search history.

(56) References Cited

U.S. PATENT DOCUMENTS

| 5,491,681 A * | 2/1996 | Klein | G11B 5/59611 327/58 |
|---|---|---|---|
| 6,094,434 A * | 7/2000 | Kotzur | H04L 49/351 370/401 |
| 7,499,500 B2 * | 3/2009 | Page | H04J 3/00 375/295 |
| 2007/0286195 A1 * | 12/2007 | Ilnickl | H04L 43/00 370/392 |
| 2013/0155861 A1 * | 6/2013 | Bryers | H04L 29/06 370/235 |

* cited by examiner

*Primary Examiner* — Jamaal Henson
(74) *Attorney, Agent, or Firm* — Klarquist Sparkman, LLP (57) ABSTRACT

Technologies are provided for preventing transmission of cyclic redundancy check (CRC) errors, and/or other errors, within a computer network that uses cut-through forwarding of network packets. For example, counts of CRC errors can be maintained for network packets processed by network devices. When a CRC error condition is detected based on the counts of CRC errors, cut-through forwarding is disabled on at least a portion of the network (e.g., on one or more specific network ports and/or on one or more specific network devices). While cut-through forwarding is disabled, the affected portion of the network uses store-and-forward for processing network packets. When the CRC error condition no longer exists, then cut-through forwarding is re-enabled on the portion of the network.

19 Claims, 8 Drawing Sheets

PREVENTING TRANSMISSION OF ERRORS IN A COMPUTING NETWORK

BACKGROUND

In order to communicate network traffic between a source device and a destination device, packet forwarding networks forward packets between network devices, such as routers and switches, along the path between the source and the destination. In some computer networks, network devices implement various forwarding strategies, which can include store-and-forward and cut-through forwarding. With store-and-forward, the entire network packet is received before it is forwarded on. With cut-through forwarding, the network device does not have to wait for the entire packet to be received before beginning to forward it on to the next network device.

While cut-through forwarding can reduce the latency of network packets being transmitted through the computer network, cut-through forwarding has some drawbacks. For example, with cut-through forwarding corrupted network packets can be transmitted across a number of network devices before the problem is discovered. In addition it may be difficult to identify the particular source of the network packet corruption because a number of network devices may register the error.

DETAILED DESCRIPTION

Overview

The following description is directed to technologies for automatically preventing transmission of cyclic redundancy check (CRC) errors within a computer network that uses cut-through forwarding of network packets. For example, counts of CRC errors can be maintained for network packets processed (e.g., received and/or transmitted) by network devices (e.g., routers, switches, gateways, or other networking devices that process network packets). When a CRC error condition is detected based on the counts of CRC errors, cut-through forwarding is disabled on at least a portion of the network (e.g., on one or more specific network ports and/or on one or more specific network devices). While cut-through forwarding is disabled, the affected portion of the network uses store-and-forward for processing network packets. When the CRC error condition no longer exists, then cut-through forwarding is re-enabled on the portion of the network.

The technologies described herein are implemented within the context of a computer network in which some or all of the network devices are using cut-through forwarding. Network devices generally use two types of forwarding strategies for network packets (also called frames), store-and-forward and cut-through forwarding. With store-and-forward network packet processing, the entire network packet is received before it is forwarded on to the next hop or destination computing device. With cut-through forwarding, the network packet is forwarded as it is received. Cut-through forwarding provides a reduction in latency when compared to store-and-forward because the network device does not have to wait until the entire packet has been received before forwarding it on to the next network device or destination computing device. For example, a network device receiving a network packet can examine the packet header and being forwarding the network packet to the next hop along the path to the ultimate destination as the network packet is being received (before the whole network packet has been received by the network device). Other network devices along the path can do the same thing.

With store-and-forward, detecting CRC errors can be straightforward as the network packets are received and their CRC values are evaluated before the network packets are forwarded on. If a given network packet fails its CRC check, then that network packet can be discarded and not forwarded. With cut-through forwarding, however, the network device will not know if there is an error with the packet until the entire packet has been received because the CRC field is located at or near the end of the packet (after the packet payload data). Therefore, when cut-through forwarding is being used, the network devices (e.g., five, ten, or more network devices) along the path of a network packet with a CRC error will each experience a CRC error with that network packet. As a result, networks using cut-through forwarding will generate more CRC errors because network packets with CRC errors can be propagated across many devices of the network. In addition, it can be difficult to isolate the source of the CRC errors in a cut-through network.

In a computer network, a CRC error is identified using a CRC value stored in a CRC field (called the frame check sequence field) in an Ethernet frame portion of a network packet. A CRC error indicates that some data within the network packet is corrupted. Corruption of network packet data can be caused by, for example, a failing network interface of a server or network device, a network cable problem (e.g., a loose optical or electrical connection), or an environmental factor (e.g., vibration or heat). In some implementations, other types of network packet errors (also called packet errors) can be monitored and used (e.g., separately or in combination with CRC errors) when deciding whether to disable cut-through forwarding. For example, forward error correction errors, framing errors, and/or header checksum errors can be used.

Using the technologies described herein, the transmission of network packets with CRC errors can be prevented (e.g., propagation of CRC errors that are the result of cut-through forwarding can be reduced). In some implementations, counts of CRC errors are maintained for network packets transmitted by network ports of a network device that is using cut-through forwarding. By monitoring the counts of CRC errors, the network device can detect a CRC error condition that is occurring on a network port of the network device. The CRC error condition can be detected, for example, when the CRC error rate increases above a threshold value (e.g., a static threshold value or a threshold value that varies dynamically based on network traffic or other criteria). Once the CRC error condition has been detected, cut-through forwarding can be disabled on the network port so that the network port uses store-and-forward network packet processing. Once the CRC error condition has been resolved, cut-through forwarding can be re-enabled on the network port.

Using the technologies described herein to prevent transmission of CRC errors can provide benefits in terms of network performance and computing resource utilization. For example, if network packets with CRC errors are re-transmitted by a number of network devices using cut-through forwarding, then the number of network devices will each have to spend computing resources processing the network packets and utilize network bandwidth for each re-transmission. Using the technologies described herein, the number of network packets with CRC errors that are transmitted can be reduced by disabling cut-through forwarding on network ports (or entire network devices) experiencing such CRC errors. As a result, the network devices do not have to expend computing resources processing such network packets and network bandwidth is available for other traffic (e.g., thus reducing congestion and improving performance).

Preventing Transmission of CRC Errors by Network Devices

In any of the implementations described herein, transmission of CRC errors can be prevented by network devices within a computer network. For example, the network devices can maintain counts of CRC errors, detect CRC error conditions, disable cut-through forwarding on individual network ports (or groups of network ports or entire network devices), and/or re-enable cut-through forwarding on individual network ports (or groups of network ports or entire network devices).

Figure 1:
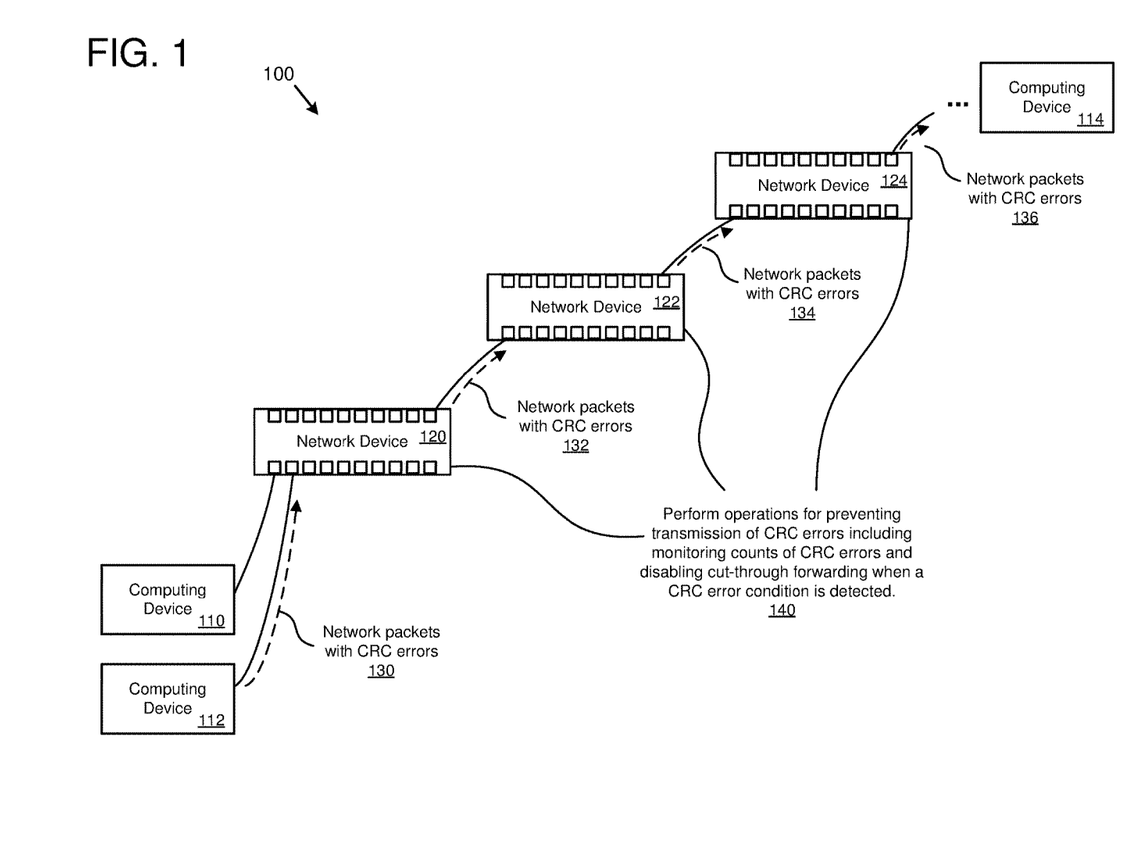
FIG. 1 is a diagram depicting an example of preventing transmission of CRC errors within a computer network.

FIG. 1 is a diagram 100 depicting an example of preventing transmission of CRC errors within a computer network. The diagram 100 is a simplified diagram that only depicts a few devices and network connections for ease of illustration. A real-world computing environment would typically contain many more computing devices, network devices, network connections and network fabrics, and other computing resources.

In the diagram 100, three example computing devices 110, 112, and 114 are depicted. For example, the computing devices 110, 112, and 114 can be server computers (e.g., running virtual machine instances) or other types of computing devices (e.g., desktop or laptop computers). Three example network devices 120, 122, and 124 are also depicted. For example, the network devices 120, 122, and 124 can be switches, routers, or other types of networking equipment that process network packets. The network devices 120, 122, and 124 can be part of a larger network of a business or organization (e.g., part of a data center network that can comprise network fabrics, such as multi-tiered network fabrics). The network devices 120, 122, and 124 each have a number of network ports for connecting to computing devices or other network devices. In the diagram 100 a number of example network links are depicted. Specifically computing devices 110 and 112 are connected network device 120. For example, computing devices 110 and 112 may have network interfaces (e.g., gigabit Ethernet network interfaces) connected to wired Ethernet cables (or using another physical network technology, such as token ring) that connects to network ports of network device 120. Network device 120 is connected to network device 122. Network device 122 is connected to network device 124. Network device 124 is ultimately connected (by some intermediary networking devices such as one or more switches or routers, which are not depicted) to computing device 114.

The diagram 100 depicts an example flow of network packets (e.g., Internet Protocol (IP) network packets operating over Ethernet) from computing device 112 (which is the source of the network packets in this example) to computing device 114 (which is the destination of the network packets in this example). The Computing device 112 sends the network packets over the network link that is connected to a first network port of network device 120 (the network port of network device 120 that is connected to computing device 112 is called a "first" network port for ease of identification in this example). In order for the network packets to reach the destination computing device 114, the network device 120 transmits the network packets via a second network port of network device 120, which is connected to a first network port of network device 122. Network device 122, in turn, transmits the network packets via a second network port to a first network port of network device 124. The network packets are received and transmitted in this way until they are received at the destination computing device 114.

In the diagram 100, network devices 120, 122, and 124 support cut-through forwarding (e.g., cut-through forwarding is enabled on all network ports of network devices 120, 122, and 124). Therefore, network device 120 will begin transmitting a network packet it receives from computing device 112 to network device 122 before the complete network packet has been received by network device 120. Network device 122 will do the same thing, as will network device 124.

In the diagram 100, the network packets being transmitted from computing device 112 to computing device 114 are experiencing CRC errors, as depicted at 130. For example, the network cable connecting computing device 112 to network device 120 may have a problem, which is introducing corruption in the packet data. Network device 120 will record the CRC errors, but not until network device 120 has completed reception of a given network packet and checked its CRC value, at which time the given network packet will have already traversed network devices 122 and 124 causing CRC errors at those network devices as well (as depicted at 132, 134, and 136, the network packets being transmitted will also have CRC errors). While the diagram 100 depicts the source of the CRC errors as the computing device 112, or the link between the computing device 112 and the network device 120, in general CRC errors can be introduced by computing devices, network devices, or network links. For example, network device 120 or 122, or the link between them, could be the source of CRC errors in a different scenario.

As depicted at 140, the network devices 120, 122, and 124 perform operations for preventing transmission of CRC errors within the computer network, including monitoring counts of CRC errors and disabling cut-through forwarding when a CRC error condition is detected. For example, network devices 120, 122, and 124 can detect a CRC error condition when the number of network packets with CRC errors is above a threshold value (e.g., more than a certain number of network packets with CRC errors are received and/or transmitted over a certain time period). When a CRC error condition is detected, the network devices 120, 122, and 124 can disable cut-through forwarding. For example, the network devices 120, 122, and 124 can disable cut-through forwarding on the network ports for which the CRC error condition has been triggered (e.g., network device 120 can disable cut-through forwarding on the network port connected to network device 122, network device 122 can disable cut-through forwarding on the network port connected to network device 124, and network device 124 can disable cut-through forwarding on the network port connected, via some intermediary network devices, to computing device 114). Cut-through forwarding can be disabled on network ports receiving incoming network packets with CRC errors and/or network ports transmitting network packets with CRC errors. The network devices 120, 122, and 124 can also detect packet error conditions based on network packets with other types of errors (e.g., in addition to, or instead of, CRC errors), such as header errors, forward error correction errors, framing errors, and/or other types of packet errors that result in corrupted network packets.

Figure 2:
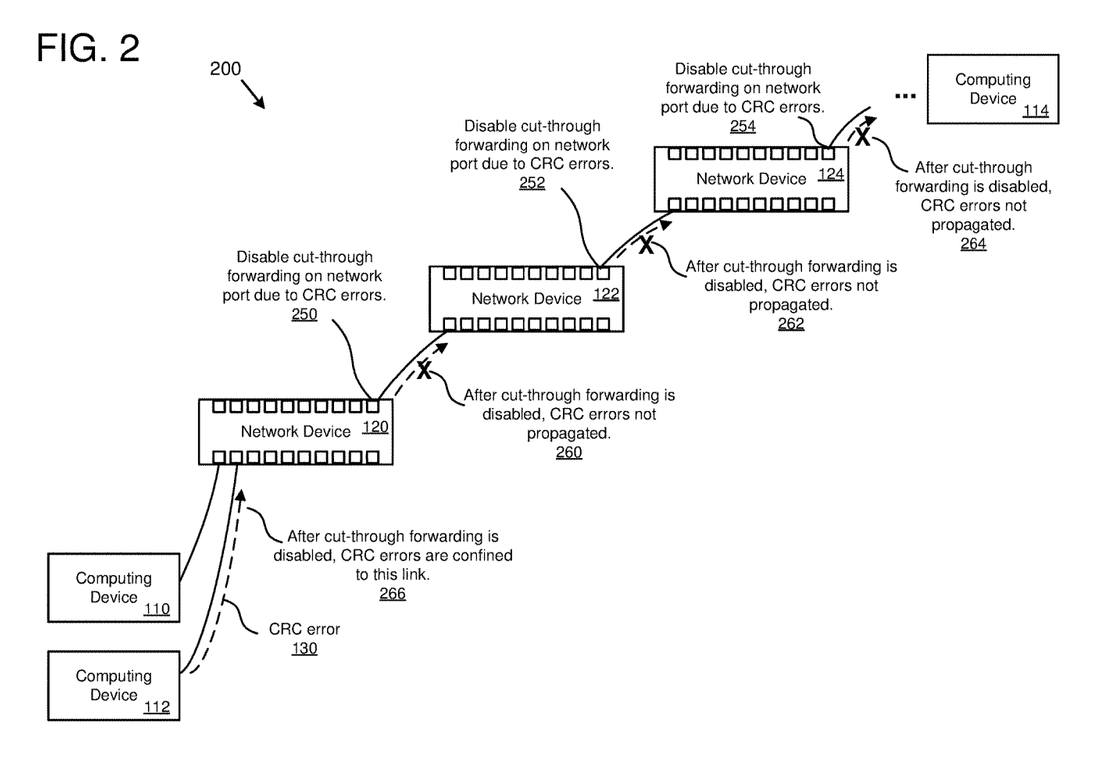
FIG. 2 is a diagram depicting an example of preventing transmission of CRC errors within a computer network, including disabling cut-through forwarding.

FIG. 2 is a diagram 200 depicting an example of preventing transmission of CRC errors within a computer network, including disabling cut-through forwarding. The diagram 200 depicts the state of the computer network from FIG. 1 after cut-through forwarding has been disabled. Specifically, network device 120, upon detecting the CRC error condition, has disabled cut-through forwarding on the network port (which was transmitting network packets with CRC errors) connected to network device 122, as depicted at 250. Network device 122, upon detecting the CRC error condition, has disabled cut-through forwarding on the network port (which was transmitting network packets with CRC errors) connected to network device 124, as depicted at 252. Network device 124, upon detecting the CRC error condition, has disabled cut-through forwarding on the network port (which was transmitting network packets with CRC errors) connected, via one or more intermediary network devices, to computing device 114, as depicted at 254. While the diagram 200 illustrates disabling cut-through forwarding on network ports transmitting network packets, some implementations support disabling cut-through forwarding on network ports receiving network packets for which a CRC error condition has been detected instead of, or in addition to, network ports transmitting network packets.

After cut-through forwarding has been disabled on the indicated network ports of network devices 120, 122, and 124, those indicated network ports use store-and-forward when transmitting network packets. Therefore, after cut-through forwarding has been disabled, network devices 120, 122, and 124 will no longer transmit any network packets on the indicated network ports (indicated at 250, 252, and 254) that have CRC errors (as indicated at 260, 262, and 264) because if any network packets are received that would be transmitted by the indicated network ports, and those network packets have CRC errors, they will not be transmitted when store-and-forward processing is performed and the CRC errors are detected. After cut-through forwarding has been disabled, if network packets are still being transmitted with CRC errors from computing device 112 to computing device 114, they will be confined to the network link between computing device 112 and network device 120, as indicated at 266. In other words, network packets with CRC errors will not propagate beyond network device 120 (they will be received by network device 120 and, using store-and-forward network packet processing, the CRC errors will be detected and the network packets will not be transmitted on to network device 122). In this way, network packets with CRC errors are controlled or isolated by preventing propagation of the network packets by network devices.

As depicted in FIGS. 1 and 2, the operations for preventing transmission of CRC errors (e.g., monitoring counts of CRC errors, detecting CRC error conditions, and disabling and re-enabling cut-through forwarding) are performed by the network devices (e.g., network devices 120, 122, and 124). For example, the operations can be performed by software running on the control CPUs of the network devices. The operations can also be performed in firmware or hardware (e.g., at the application-specific integrated circuit (ASIC) level) of the network device, or a combination of software, firmware, and/or hardware can be used. A CPU can also be used in combination with an ASIC (e.g., the ASIC performs some of the operations of the network device, while the CPU handles other operations and/or controls the configuration of the ASIC).

When the network devices implement the operations for preventing transmission of CRC errors, a number of benefits can be realized. For example, having each network device automatically determine CRC error conditions and control disabling and enabling of cut-through forwarding allows each network device to operate independently (e.g., there are no global counters), and the network devices are not affected by the size of the computer network. For example, there is no dependency between devices and the technology can scale to any network size.

The example situations depicted in FIGS. 1 and 2 involve a unicast flow of network packets from computing device 112 to computing device 114. However, the technologies described herein also work when the traffic packets are multicast or broadcast. For example, in a multicast or broadcast situation, a CRC error condition may be determined for a number of network ports of a given network device (e.g., a number of network ports may each register outbound CRC errors above an error threshold), and the number of network ports may have cut-through forwarding disabled.

In some implementations, a CRC error condition is detected when CRC errors increase above an error threshold for a given network port. For example, when an outbound count of CRC errors for a network port increases above a threshold rate based on the number of CRC errors per unit time (e.g., more than one CRC error per second), then the network device can identify a CRC error condition for the network port. As another example, the number of CRC errors needed to trigger a CRC error condition can be based on a threshold rate determined by the number of CRC errors per amount of network traffic, such as a percentage of network packets received and/or transmitted (e.g., a CRC error rate of more than one in a hundred thousand network packets). In some implementations, CRC error conditions are detected based on inbound counts of CRC errors (e.g., for network devices that do not support CRC error tracking for transmitted network packets). In addition, different network devices can have different thresholds.

Cut-through forwarding can be re-enabled on a network port or on a network device when the CRC error condition has ended. In some implementations, the CRC error condition is determined to have ended when no CRC errors are detected during a period of time (e.g., when no inbound CRC errors are detected, based on CRC error counts, by the computing device for a period of time, such as a number of seconds or minutes). In some implementations, the CRC error condition is determined to have ended when CRC errors fall below a second error threshold. For example, a first (or upper) error threshold (e.g., 10 CRC errors per minute) can be used to determine when a CRC error condition exists and a second (or lower) error threshold (e.g., 2 CRC errors per minute) can be used to determine when the CRC error condition has ended.

Preventing Transmission of CRC Errors Using a Monitoring Service

In any of the implementations described herein, transmission of CRC errors can be prevented within a computer network using a monitoring service. For example, the monitoring service can perform some of all of the operations for preventing transmission of CRC errors (e.g., that would otherwise be performed by the network devices as discussed above in relation to FIGS. 1 and 2). For example, the monitoring service can poll or receive counts of CRC errors from network devices, detect CRC error conditions, instruct the network devices to disable cut-through forwarding, and/or instruct the network devices to re-enable cut-through forwarding.

Figure 3:
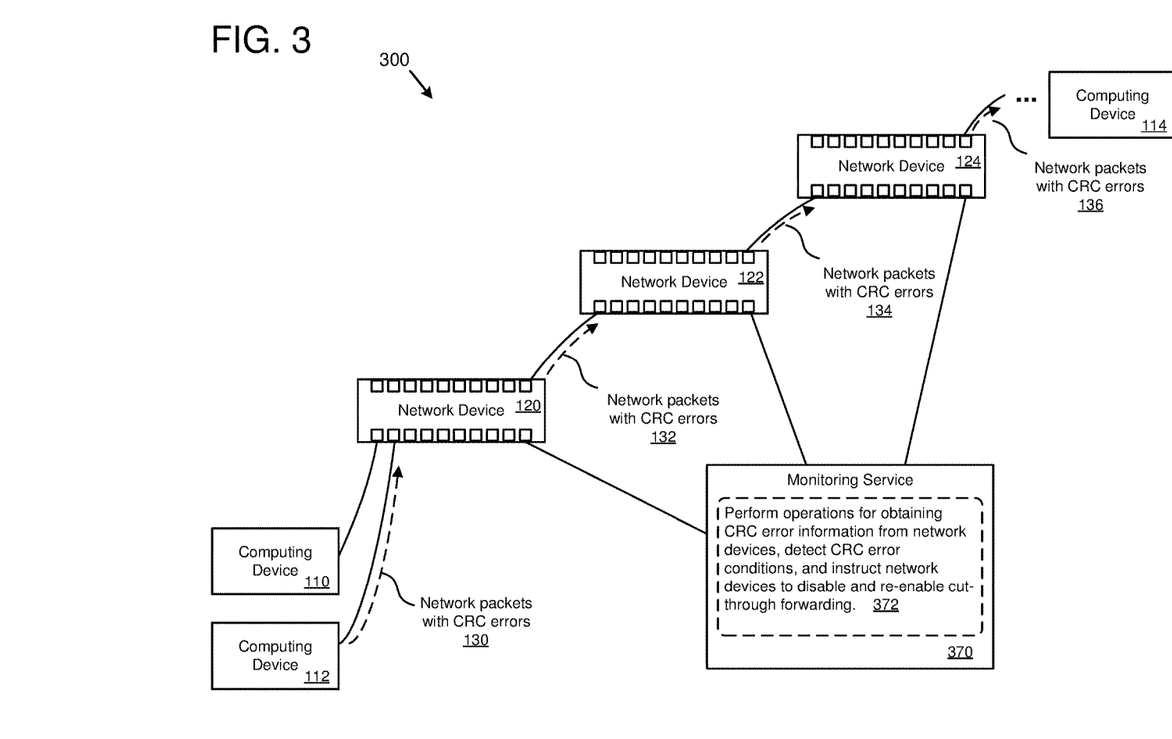
FIG. 3 is a diagram depicting an example of preventing transmission of CRC errors within a computer network using a monitoring service.

FIG. 3 is a diagram 300 depicting an example of preventing transmission of CRC errors within a computer network using a monitoring service 370. The monitoring service 370 can run on one or more computing devices (e.g., one or more computer servers) that are connected to the computer network. In some implementations, the computing devices running the monitoring service 370 are connected to some or all of the network devices (e.g., network devices 120, 122, and 124) directly via management network links (e.g., to dedicated management network ports on the network devices).

As depicted in the diagram 300, the monitoring service 370 is connect (e.g., directly via management network links or indirectly via a connection to the computer network) to network devices 120, 122, and 124. As depicted at 372, the monitoring service 370 performs operations for preventing transmission of CRC errors within the computer network, which can include obtaining CRC error information from the network devices, detecting CRC error conditions, and instructing network devices to disable and re-enable cut-through forwarding.

In order to obtain CRC error information from the network devices, the monitoring service 370 can poll network devices 120, 122, and 124 for counts of CRC errors (e.g., for received and/or transmitted network packets) on a periodic basis (e.g., once per minute). Network devices 120, 122, and 124 can also send counts of CRC errors to the monitoring service 370.

In order to detect CRC error conditions, the monitoring service 370 can use obtained counts of CRC errors. For example, the monitoring service 370 can detect a CRC error condition when CRC errors of a network port of one of the network devices 120, 122, or 124 increases above an error threshold. CRC error conditions can also be determined by the network devices 120, 122, and 124 and communicated (e.g., via alerts) to the monitoring service 370. The monitoring service 370 can also detect packet error conditions based on network packets with other types of errors (e.g., in addition to, or instead of, CRC errors), such as header errors, forward error correction errors, framing errors, and/or other types of packet errors that result in corrupted network packets.

When a CRC error condition is identified by the monitoring service 370 (e.g., either directly by the monitoring service 370 or via an alert from one of the network devices), the monitoring service 370 can send an instruction to the affected network device to disable cut-through forwarding on a specific network port so that network packets being processed (e.g., transmitted and/or received) by the specific network port use cut-through forwarding, or send an instruction to the affected network device to disable cut-through forwarding on the entire network device.

When the CRC error condition has been resolved (e.g., determined by polling the network device and determining that CRC errors are no longer being recorded or have dropped below a threshold value or rate), the monitoring service 370 can instruct the affected network device to re-enable cut-through forwarding (e.g., on a specific network port or the whole network device).

In some implementations, the monitoring service 370 uses the CRC error information and/or the detected CRC error conditions to locate a source of the CRC errors. For example, the monitoring service 370 can identify which of the network devices (e.g., network device 120, 122, or 124) is still experiencing CRC errors after cut-through forwarding has been disabled. For example, if the source of the errors is the network link between computing device 112 and network device 120, then CRC errors will still be recorded for network packets being received by network device 120 after cut-through forwarding has been disabled. The monitoring service 370 can determine this situation (e.g., by polling or receiving counts of CRC errors) and identify that network device 120 is still receiving inbound CRC errors and on which port, and take some action (e.g., send a communication or alert for a technician to check the network link connected to the network port receiving inbound CRC errors).

Disabling Cut-Through Forwarding on Network Ports

In some implementations, a network device maintains a count of inbound CRC errors and a count of outbound CRC errors for each of the network ports of the network device. An inbound CRC error occurs when a network packet is received on a given port and the network packet has a CRC error (determined once the entire packet has been received and its CRC value is checked). An outbound CRC error occurs when a network packet is transmitted on a given port and the network packet has a CRC error (determined once the entire packet has been transmitted and its CRC value is checked). In some implementations, the counts of inbound and outbound CRC errors are maintained by incrementing simple network management protocol (SNMP) objects (e.g., an inbound and an outbound CRC error object for each network port).

In some implementations, a network device only maintains a count of inbound CRC errors for its network ports and not a count of outbound CRC errors. For example, the network device may not support checking for CRC errors on transmitted network packets. In some implementations, the counts of inbound CRC errors are maintained by incrementing SMNP objects (e.g., an inbound CRC error object for each network port).

In some implementations, when counts of inbound and outbound CRC errors are maintained on a port-by-port basis for a network device, disabling of cut-through forwarding is also performed on a port-by-port basis using the outbound CRC error counts for network packets transmitted for a given network port. In some implementations, when a network device only maintains a count of inbound CRC errors, disabling of cut-through forwarding is performed for the entire network device. For example, if network packets are being received by a network device with CRC errors and a CRC error condition is determined to exist, then cut-through forwarding is disabled for the entire network device so that all ports of the network device switch to store-and-forward network packet processing when transmitting network packets.

While cut-through forwarding is typically an attribute of network ports when transmitting network packets, it is also possible to disable cut-through forwarding when receiving network packets. Therefore, cut-through forwarding can be disabled based on inbound CRC error counts (e.g., instead of, or in addition to, disabling cut-through forwarding based on outbound CRC error counts). For example, if network packets are being received by a network device with CRC errors, the network port whose inbound CRC error count indicates a CRC error condition can have cut-through forwarding disabled for received network packets.

Methods for Preventing Transmission of CRC Errors

In any of the technologies described herein, methods can be provided for preventing transmission of CRC errors by network devices (and/or a management service) within a computer network. For example, the network devices can maintain counts of CRC errors, detect CRC error conditions, disable cut-through forwarding on individual network ports (or groups of network ports or entire network devices), and/or re-enable cut-through forwarding on individual network ports (or groups of network ports or entire network devices).

Figure 4:
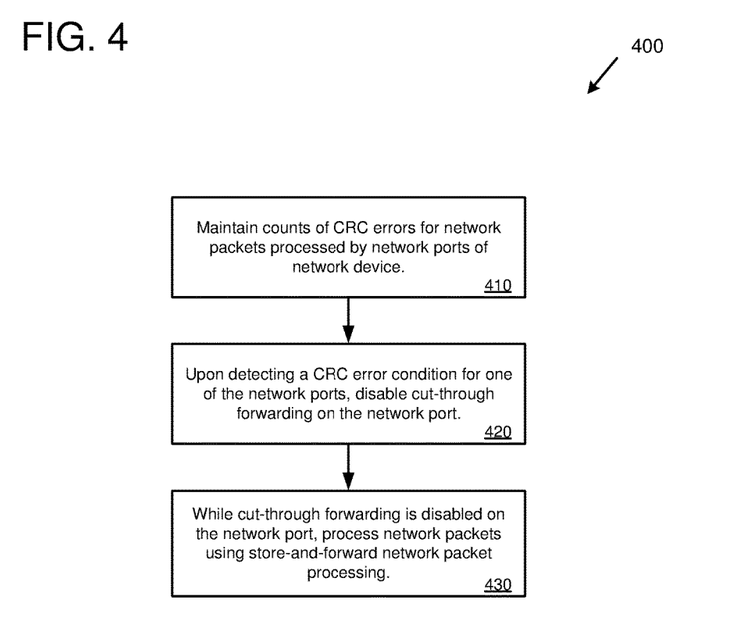
FIG. 4 is a flowchart of an example method for preventing transmission of CRC errors by disabling cut-through forwarding on a network port.

FIG. 4 is a flow chart of an example method 400 for preventing transmission of CRC errors by disabling cut-through forwarding on network ports. For example, the example method 400 can be performed by a network device (e.g., by network device 120, 122, or 124), such as a router, switch, or other type of network device that transmits network packets using cut-through forwarding.

At 410, counts of CRC errors are maintained for network packets processed by network ports of the network device (e.g., transmitted network packets, received network packets, or both transmitted and received network packets by network ports of the network device). The network device supports cut-through forwarding, and cut-through forwarding is enabled on the network ports of the network device.

At 420, upon detecting a CRC error condition for one of the network ports, cut-through forwarding is disabled on the network port. The CRC error condition is detected when CRC errors of the network port increase above an error threshold. For example, if the count of outbound CRC errors for the network port increases above a threshold rate, then the CRC error condition can be triggered (e.g., a fixed rate of CRC errors per time period or a dynamic rate that depends on network traffic). When cut-through forwarding is disabled for the network port, the network port uses store-and-forward when processing network packets. In addition, disabling cut-through forwarding on the network port does not affect cut-through forwarding status of the other network ports of the network device. Therefore, cut-through forwarding can be disabled on one network port of the network device while other network ports of the network device still process network packets using cut-through forwarding.

At 430, while cut-through forwarding is disabled on the network port, network packets are processed by the network port using store-and-forward network packet processing.

When the CRC error condition has ended for the network port, cut-through forwarding is re-enabled on the network port so that the network port supports cut-through forwarding when processing network packets. In some implementations, the CRC error condition ends when no inbound network packets are received with CRC errors for a period of time (e.g., for a number of seconds or minutes). In some implementations, the CRC error condition ends when the rate of CRC errors drops below a second error threshold (e.g., a lower threshold rate than the one used to trigger the CRC error condition).

Figure 5:
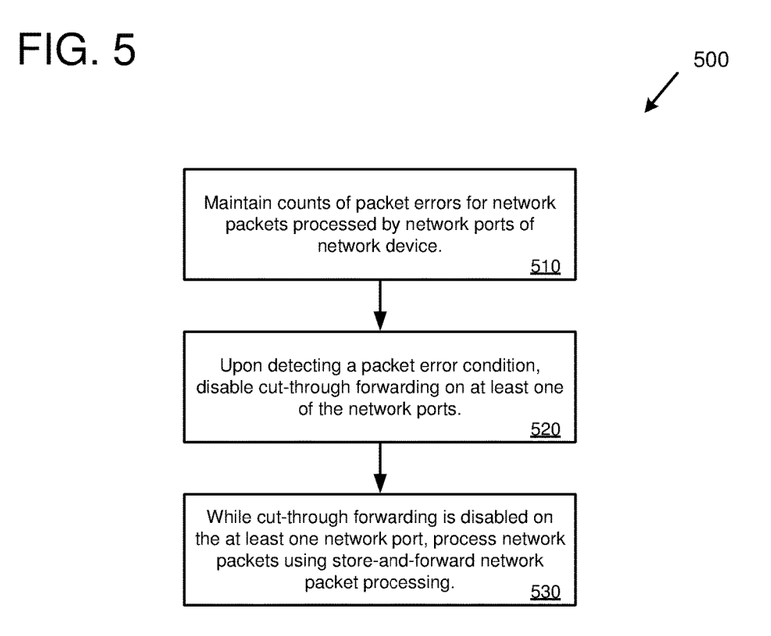
FIG. 5 is a flowchart of an example method for preventing transmission of CRC errors by disabling cut-through forwarding on one or more network ports.

FIG. 5 is a flow chart of an example method 500 for preventing transmission of packet errors by disabling cut-through forwarding on one or more network ports. For example, the example method 500 can be performed by a network device (e.g., by network device 120, 122, or 124), such as a router, switch, or other type of network device that transmits network packets using cut-through forwarding. The packet errors can be CRC errors, header errors, forward error correction errors, framing errors, and/or other types of packet errors that result in corrupted network packets.

At 510, counts of packet errors are maintained for network packets processed by network ports of the network device (e.g., transmitted network packets, received network packets, or both transmitted and received network packets by network ports of the network device). In some implementations, counts of packet errors are maintained for inbound network packets (e.g., a separate counter can be maintained for each network port that records packet errors for inbound network packets). In some implementations, counts of packet errors are maintained for outbound network packets (e.g., a separate counter can be maintained for each network port that records packet errors for outbound network packets). In some implementations, counts of packet errors are maintained for both inbound network packets and outbound network packets (e.g., separate inbound and outbound packet error counters can be maintained for each of the network ports of the network device).

At 520, upon detecting a packet error condition based on the counts of packet errors, cut-through forwarding is disabled on at least one of the network ports of the network device. The packet error condition can be detected when a rate of packet errors (e.g., a rate of inbound CRC errors from received network packets and/or a rate of outbound CRC errors from transmitted network packets) increases above an error threshold (e.g., a fixed rate of packet errors per time period or a dynamic rate that depends on network traffic). When cut-through forwarding is disabled for the at least one network port, the at least one network port uses store-and-forward when processing network packets.

At 530, while cut-through forwarding is disabled on the at least one network port, network packets are processed by the at least one network port using store-and-forward network packet processing.

In some implementations, the network device disables cut-through forwarding (as depicted at 520) on the whole network device so that cut-through forwarding is disabled on all network ports (so that all network ports use store-and-forward when processing network packets). For example, disabling cut-through forwarding on all network ports can be performed when the network device does not support outbound CRC error tracking. When the CRC error condition has ended, cut-through forwarding can be re-enabled on all network ports.

In some implementations, the network device disables cut-through forwarding (as depicted at 520) on a port-by-port basis, which supports disabling cut-through forwarding on network ports on an individual network port basis (so that an individual network port uses store-and-forward when processing network packets). For example, disabling cut-through forwarding on a port-by-port basis can be performed when the network device supports outbound CRC error tracking. When the CRC error condition has ended, cut-through forwarding can be re-enabled on an individual network port basis.

When the packet error condition has ended for the at least one network port, cut-through forwarding is re-enabled on the at least one network port so that the network port supports cut-through forwarding when processing network packets. In some implementations, the packet error condition ends when no inbound network packets are received with packet errors for a period of time (e.g., for a number of seconds or minutes). In some implementations, the packet error condition ends when the rate of packet errors drops below a second error threshold (e.g., a lower threshold rate than the one used to trigger the packet error condition).

Figure 6:
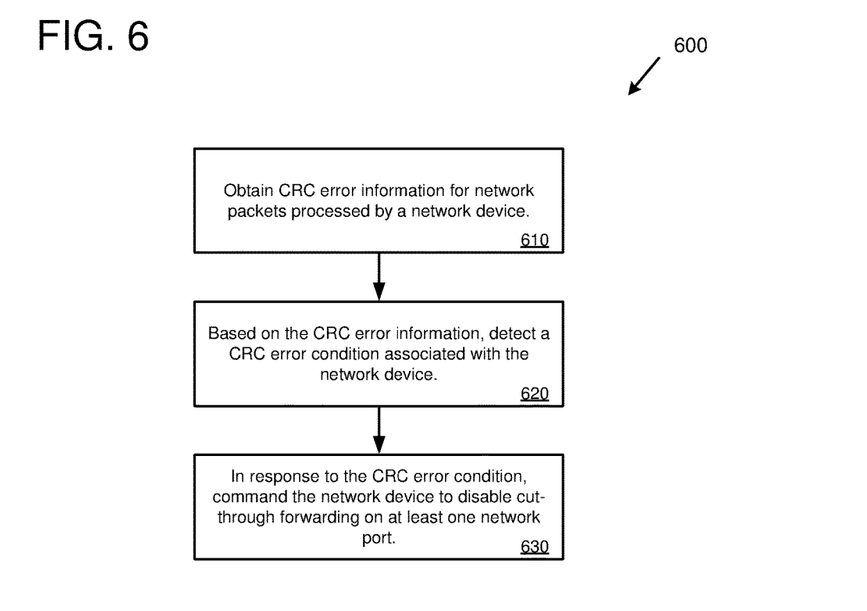
FIG. 6 is a flowchart of an example method, performed by a monitoring service, for preventing transmission of CRC errors by disabling cut-through forwarding on one or more network ports.

FIG. 6 is a flow chart of an example method 600, performed by a monitoring service, for preventing transmission of CRC errors by disabling cut-through forwarding on one or more network ports. For example, the example method 600 can be performed by monitoring service 370.

At 610, CRC error information is obtained for network packets processed by a network device (e.g., transmitted network packets, received network packets, or both transmitted and received network packets by network ports of the network device). The CRC error information can comprise counts of CRC errors (e.g., counts if inbound and/or outbound CRC errors) that are obtained by the monitoring service. For example, the monitoring service can poll (e.g., on a periodic basis) the network device to obtain the CRC error information, or the network device can send the CRC error information to the monitoring device. In addition to, or instead of, counts of CRC errors, the CRC error information can indicate that there is a CRC error condition associated with one or more of the network ports of the network device.

At 620, a CRC error condition associated with the network device is detected based on the CRC error information. For example, the CRC error condition can be detected for one network port (e.g., that has an outbound and/or inbound count of CRC errors that is above an error threshold). The CRC error condition can also be detected for the network device as a whole (e.g., when the network device does not support outbound CRC error tracking).

At 630, a command is sent to the network device to disable cut-through forwarding on at least one network port in response to the CRC error condition. When cut-through forwarding is disabled for the at least one network port, the at least one network port uses store-and-forward when processing network packets. For example, if the CRC error condition is caused by an outbound count of CRC errors for a specific network port increasing above an error threshold, then cut-through forwarding can be disabled on the specific network port. If the CRC error condition is caused by an inbound count of CRC errors for a specific network port increasing above an error threshold, then cut-through forwarding can be disabled on the specific network port. If the CRC error condition is caused by an inbound count of CRC errors for a specific network port (e.g., where the network device does not support outbound CRC error tracking), then cut-through forwarding can be disabled for a plurality of network ports of the network device (e.g., for all network ports of the network device that are transmitting network packets or for the network device as a whole).

Example Service Provider Environments

Figure 7:
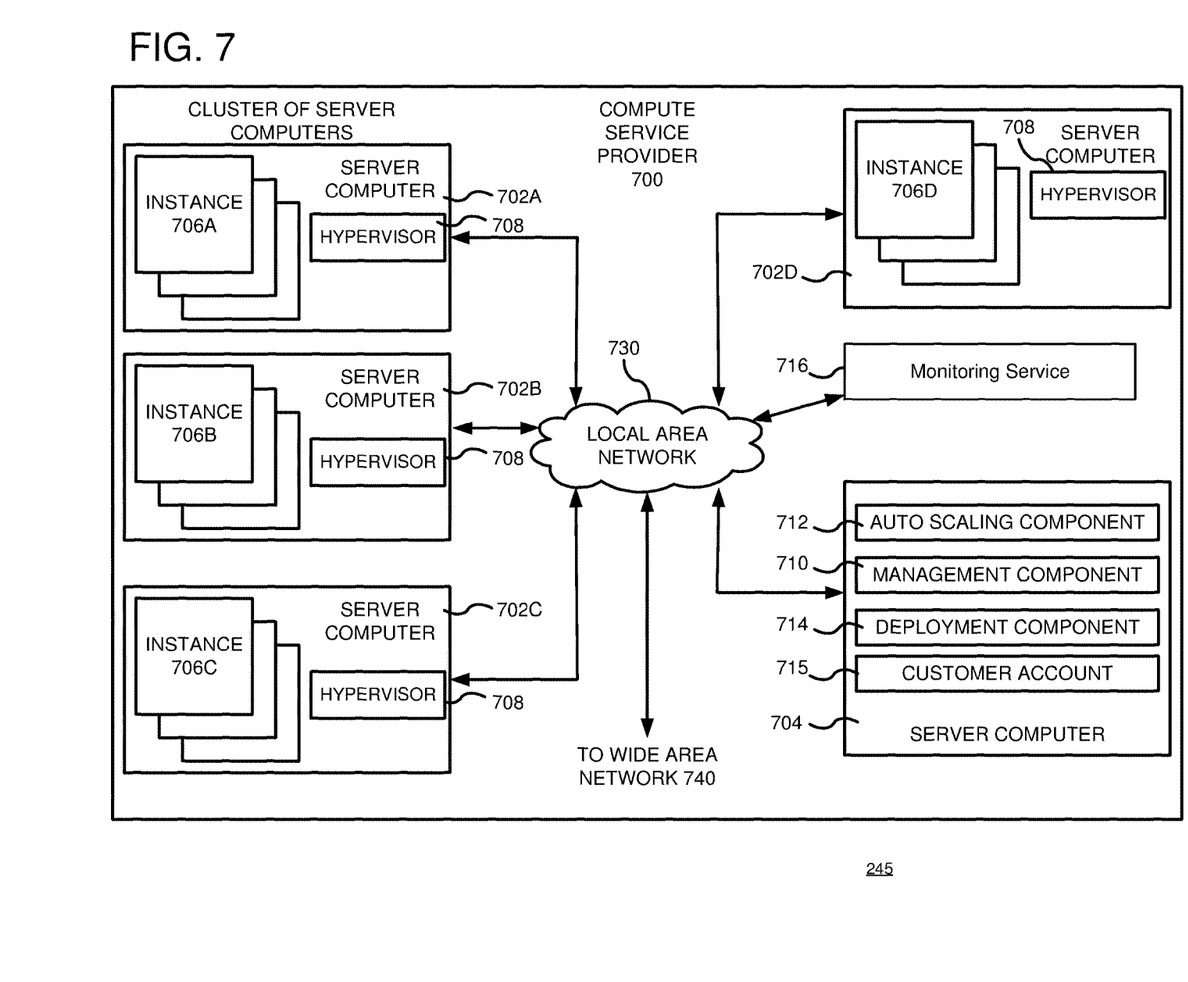
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise Clos networks or other types of multi-tiered network fabrics. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, a monitoring service 716 performs operations for preventing transmission of CRC errors within the computer network (e.g., within the local area network 730, which can include various types of networks and network fabrics) of the compute service provider 700. For example, the monitoring service 716 can poll or receive counts of CRC errors from network devices within the local area network 730, receive alerts from the network devices, detect CRC error conditions, instruct the network devices to disable cut-through forwarding, and/or instruct the network devices to re-enable cut-through forwarding.

Figure 8:
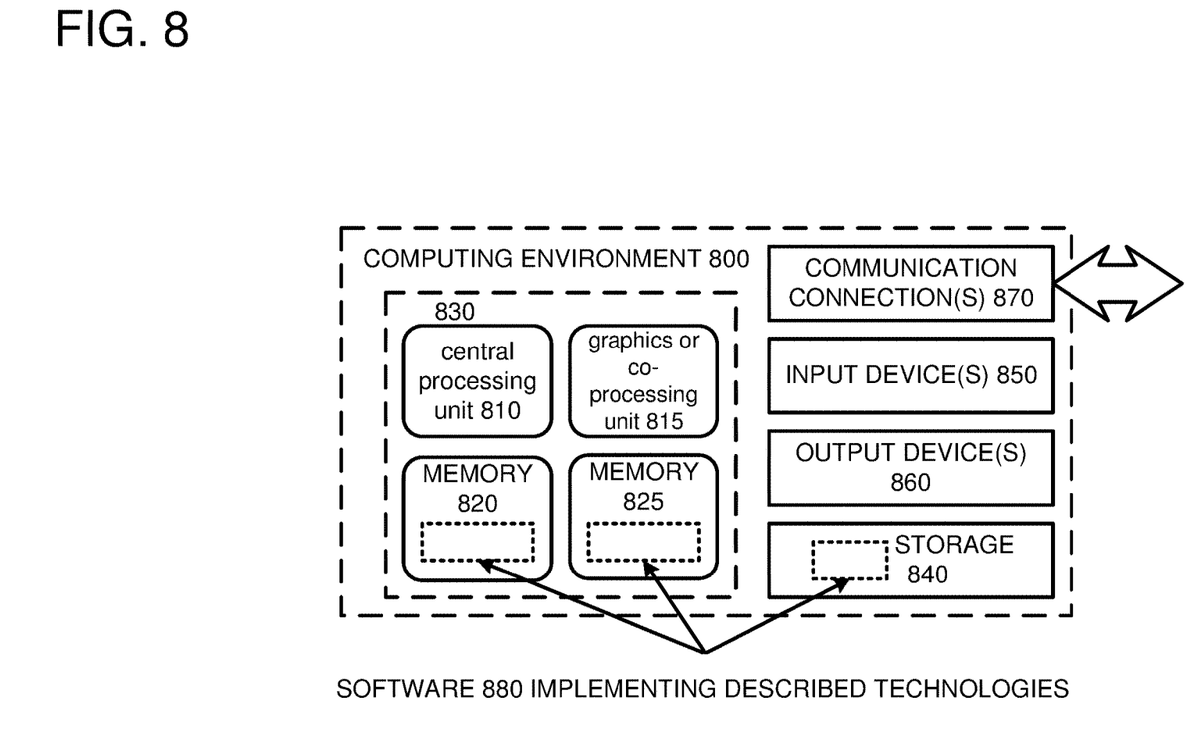
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media and executed on a computer (e.g., any commercially available computer, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A method, implemented by a network device, for preventing transmission of cyclic redundancy check (CRC) errors, the method comprising:
   maintaining counts of CRC errors for network packets processed by network ports of the network device, wherein the network device supports cut-through forwarding, and wherein cut-through forwarding is enabled on the network ports;
   upon detecting a CRC error condition indicated by CRC errors of the network packets increasing above an error threshold:
      if the network device supports tracking outbound CRC errors for transmitted network packets:
         detecting the CRC error condition for a particular network port of the network device; and
         disabling cut-through forwarding on the particular network port so that the particular network port uses store-and-forward processing when processing network packets, wherein disabling cut-through forwarding on the particular network port does not affect whether the other network ports of the network device use cut-through forwarding; and
         while cut-through forwarding is disabled on the particular network port, processing network packets via the particular network port using store-and-forward processing; and
      otherwise, if the network device does not support tracking outbound CRC errors for transmitted network packets:
         detecting the CRC error condition;

disabling cut-through forwarding for all network ports of the network device; and while cut-through forwarding is disabled on all of the network ports, processing network packets via all of the network ports using store-and-forward network packet processing.

2. The method of claim 1, further comprising:

upon detecting that the CRC error condition has ended for the particular network port:

enabling cut-through forwarding on the particular network port so that the particular network port uses cut-through forwarding when processing network packets;

wherein the CRC error condition has ended when no inbound network packets are received with CRC errors for a period of time.

3. The method of claim 1, further comprising:

upon detecting that the CRC error condition has ended for the particular network port:

enabling cut-through forwarding on the particular network port so that the particular network port uses cut-through forwarding when processing network packets;

wherein the CRC error condition has ended when a rate of CRC errors has dropped below a second error threshold.

4. The method of claim 1, wherein the error threshold is based upon a percentage of network packets received, transmitted, or received and transmitted.

5. The method of claim 1, wherein maintaining counts of CRC errors comprises maintaining a count of inbound CRC errors and a count of outbound CRC errors for each of the network ports of the network device, and wherein the particular network port is transmitting or receiving the network packets.

6. A network device comprising:

a processing unit; and network ports;

wherein the network device performs operations, the operations comprising:

maintaining counts of packet errors for network packets processed by the network ports, wherein the packet errors comprise cyclic redundancy check (CRC) errors;

upon detecting a packet error condition based on the counts of packet errors:

if the network device supports tracking outbound CRC errors for transmitted network packets:

detecting the packet error condition for one of the network ports; and disabling cut-through forwarding on only the one network port; and while cut-through forwarding is disabled on the one network port, processing network packets via the one network port using store-and-forward network packet processing; and otherwise, if the network device does not support tracking outbound CRC errors for transmitted network packets:

detecting the packet error condition; and disabling cut-through forwarding for all network ports of the network device; and while cut-through forwarding is disabled on all of the network ports, processing network packets via all of the network ports using store-and-forward network packet processing.

7. The network device of claim 6, wherein the network device does not support tracking outbound CRC errors for transmitted network packets, and wherein counts of packet errors are maintained for inbound network packets.

8. The network device of claim 7, wherein the packet error condition is detected when a rate of packet errors exceeds an error threshold.

9. The network device of claim 7, the operations further comprising:

upon detecting that the packet error condition has ended:

enabling cut-through forwarding on all network ports of the network device.

10. The network device of claim 6, wherein the network device supports tracking outbound CRC errors for transmitted network packets, and wherein maintaining counts of packet errors comprises maintaining a count of inbound packet errors and a count of outbound packet errors for each of the network ports of the network device.

11. The network device of claim 10, wherein the packet error condition is detected when a rate of outbound packet errors for the one network port exceeds an error threshold.

12. The network device of claim 10, the operations further comprising:

upon detecting that the packet error condition has ended for the one network port:

enabling cut-through forwarding on the one network port so that the one network port uses cut-through forwarding when transmitting network packets.

13. The network device of claim 6, wherein the packet errors comprise header errors, forward error correction errors, or framing errors.

14. The network device of claim 6, wherein the network device is a network switch.

15. The network device of claim 6, wherein the packet error condition is detected based on counts of inbound packet errors.

16. A computer-readable storage medium storing computer-executable instructions for causing a computing device to perform operations, the operations comprising:

obtaining cyclic redundancy check (CRC) error information for network packets processed by a network device, wherein the network device supports cut-through forwarding, and wherein cut-through forwarding is enabled on a plurality of network ports of the network device;

based on the obtained CRC error information, detecting a CRC error condition associated with the network device; and if the network device supports tracking outbound CRC errors for transmitted network packets:

detecting the CRC error condition for one of the network ports; and in response to detecting the CRC error condition, sending a command to the network device to disable cut-through forwarding on only the one network port so that the one network port uses store-and-forward when processing network packets; and otherwise, if the network device does not support tracking outbound CRC errors for transmitted network packets:

detecting the CRC error condition; and in response to detecting the CRC error condition, sending a command to the network device to disable cut-through forwarding for all network ports of the network device so that all of the network ports process network packets using store-and-forward network packet processing.

17. The computer-readable storage medium of claim 16, wherein the CRC error information is obtained by polling the network device to collect counts of inbound CRC errors for received network packets processed by the network device.

18. The computer-readable storage medium of claim 16, the operations further comprising:
   upon detecting that the CRC error condition has ended:
      sending a command to the network device to enable cut-through forwarding on the network port or ports that were disabled.

19. The computer-readable storage medium of claim 16, wherein the CRC error information is obtained via an alert received, by a monitoring service, from the network device.

* * * * *